N. TESTRUP.
APPARATUS FOR CONDUCTING HIGH TEMPERATURE REACTIONS.
APPLICATION FILED MAR. 19, 1918.
1,322,652.
Patented Nov. 25, 1919.
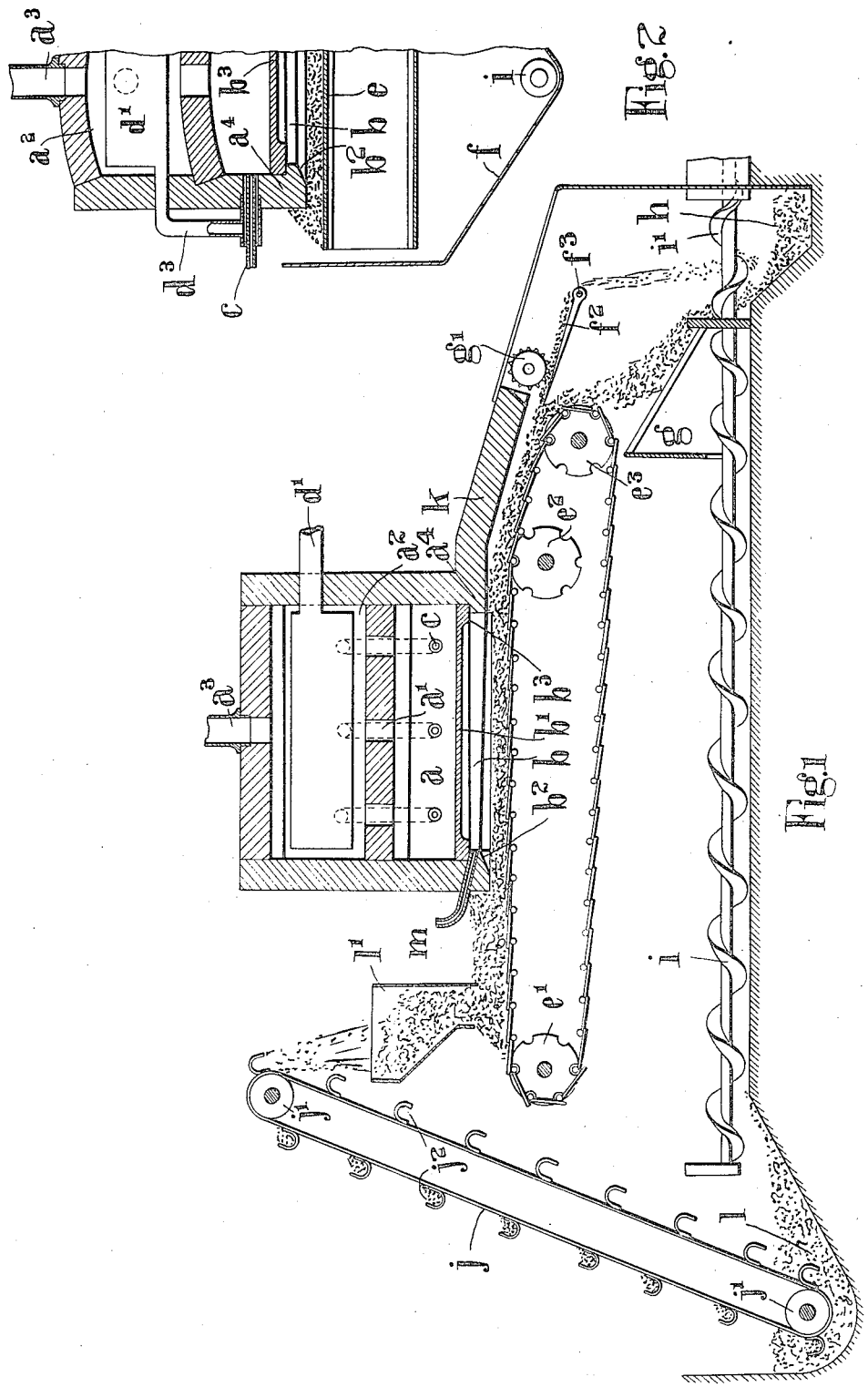
INVENTOR N. Testrup.
BY L. R. Kerslake
ATTORNEY

UNITED STATES PATENT OFFICE.

NILS TESTRUP, OF LONDON, ENGLAND, ASSIGNOR TO TECHNO-CHEMICAL LABORATORIES, LIMITED, OF LONDON, ENGLAND.

APPARATUS FOR CONDUCTING HIGH-TEMPERATURE REACTIONS.

1,322,652.    Specification of Letters Patent.    Patented Nov. 25, 1919.

Application filed March 19, 1918.   Serial No. 223,408.

*To all whom it may concern:*

Be it known that I, NILS TESTRUP, a subject of the King of Great Britain and Ireland, and residing at "Fairlawn," Clarence Road, Clapham Park, S. W. 4, London, England, have invented certain new and useful Improvements Relating to Apparatus for Conducting High-Temperature Reactions, of which the following is a specification.

This invention relates to methods of and means for conducting high temperature reactions continuously by feeding the substance to be treated in front of a source of heat.

When working continuous processes where, in order that the reaction of the substance treated may take place, high temperatures are required, it is often difficult to obtain materials for the supporting or containing members which will successfully resist the intense heat, especially having regard to the fact that the substances treated frequently contain ingredients which at the high temperatures react with the material of which the ovens or retorts are constructed. Difficulties also occur in economizing heat and in selecting suitable material for parts of the apparatus where high temperatures are required in continuous working on account of the changes of position subjecting the moving elements to considerable variations of temperature.

The exclusion from the substance under treatment of air and (or) gaseous products emanating from the source of heat, together with the production of a special atmosphere where required for facilitating a reaction, also present decided obstacles to continuous working.

The object of the present invention is to provide methods of and means for overcoming the foregoing difficulties when working high temperature reactions continuously.

The invention consists broadly in arranging a heated reaction chamber or cavity to be closed by a wall of the subdivided reacting substance, automatically introduced and removed, such wall being moved slowly or intermittently, so that each particle while traveling across is submitted to the reaction conditions for the required time.

The invention further consists in improved devices applied to separate the product of the reaction from the unacted-on substance.

The invention also consists in the improvements in high temperature continuous furnaces as hereinafter described.

Referring now to the accompanying more or less diagrammatic drawings:

Figures 1 and 2 are longitudinal and cross-sectional elevations of one convenient form of apparatus for carrying the invention into effect.

In the apparatus shown by way of example in Figs. 1 and 2, $a$ is a furnace chamber formed of suitable refractory material and having around its bottom edge an inturned ledge $a^4$ for supporting a heat transmitting membrane $b'$ formed of a slab of magnesia or other suitable material below which is the reaction chamber $b$.

The furnace chamber $a$ may be arched as shown in Fig. 2, and it is provided at opposite sides with one or more injectors or nozzles $c$ supplying gas from any convenient source. The chamber $a$ may be surmounted by a recuperator $a^2$ containing a casing $d'$ to which is supplied air under pressure by means of a suitable conduit $d^2$. Branches $d^3$ conduct the heated air to apertures $d$ in the furnace walls surrounding the nozzles $c$, and the waste products of combustion escape from the recuperator by means of a suitable outlet $a^3$.

Extending horizontally beneath the membrane $b'$ is a band conveyer $e$ formed of connected metal plates or other suitable material and supported upon main or driving rolls $e'$ $e^3$ and an intermediate jockey roll $e^2$. The band conveyer is of greater width than the furnace chamber, as shown in Fig. 2, and if desired it may be provided with upturned edges for assisting to retain thereon the subdivided substance which is to be treated.

The band conveyer $e$ is conveniently positioned within a casing $f$ having a hopper-shaped bottom extending beneath the full length of the band conveyer and in the lowest part of which operates a screw conveyer $i$ adapted to catch any material falling from the band conveyer and conduct it to a sump $l$ at one end of the casing.

In the upper part of the casing $f$ is a dividing plate or slice $f^2$ of substantially the width of the operative portion of the heating membrane $b'$ and angularly movable toward or away from the band conveyer $e$ about the axis $f^3$.

The dividing member or slice $f^2$ is operated by suitable adjusting means, comprising a lever $f^4$ fastened upon the outside of the casing to the spindle $f^3$ and having a quadrant slot $f^5$ at its extremity which coöperates with a stud $f^6$ or like fastening means outside the casing, and in coöperation therewith is a rotatable roller $g'$ extending the full width of the slice and having upon its surface suitable teeth or pins. This roller $g'$ is preferably mounted in bearing blocks $g^2$ slidably adjustable in slots $g^3$ so as to be movable with and also in relation to the slice $f^2$ in order that the space between the surface of the roller and the slice may be adjusted to and maintained at any convenient amount.

A second sump $h$ is provided beneath the pivoted end of the slice $f^2$, and immediately adjacent to the sump is an inclined screen $g$ positioned beneath the end roll $e^3$ of the band conveyer. Matter falling upon the screen $g$ and failing to pass therethrough will gravitate into the sump $h$ and a screw conveyer $i'$ may be provided by means of which such material may be continuously removed from the sump.

Situated at the end of the conveyer $e$ opposite to the slice $f^2$ is an elevator $j$ carried upon rolls $j'$ and having a series of outstanding arms, lifters or buckets $j^2$ adapted to pick up material from the sump $l$ and deposit it in a hopper $l'$ by means of which it is distributed in an even layer upon the band conveyer $e$. The lifters $j^2$ may be given any form which is most convenient for dealing with the finely subdivided substance under consideration.

Extending from the rearward side of the reaction chamber $b$ is a bridge or cover $k$ formed of suitable refractory or like material and having its lower surface sloping to correspond with the surface of the downwardly inclined portion of the band conveyer $e$. The bridge $k$ is carried back a suitable distance in order that its lower extremity may be below the level of the top of the material carried beneath the heating membrane upon the horizontal upper part of the band conveyer $e$.

The substance to be treated for producing high temperature reaction is fed in a sufficiently subdivided state either continuously or intermittently into the hopper $l'$ or alternatively, on to some part of the screw conveyer $i$ or into the sump $l$ from whence it is, by means of the elevator $j$, raised to the hopper $l'$.

The layer deposited upon the conveyer $e$ is considerably thicker than the space between the conveyer and the lower edge of the perimeter of the reaction chamber $b$ so that as the layer reaches the source of heat the superfluous substance is swept off and heaped upon each side of the conveyer, as shown in Fig. 2. This heaped-up substance, together with the portion abutting against the front wall of the reaction chamber, forms a seal or joint upon three sides of the heating surface and prevents the access of any cooler surrounding gaseous elements to the high temperature zone of the apparatus.

The substance passing beneath the heating device is subjected to the full intensity of the heat passing from the membrane $b'$, this being preferably sufficient to effect the desired reaction through a certain depth of the layer only and at the same time leaving beneath this treated stratum a sufficient depth of untreated and only moderately heated substance as will thoroughly protect the material of the conveyer from the effect of the heat.

The reaction may, in some cases, cause a diminution in the thickness of the layer and in any case a working clearance is desirable between the rearward end of the heating device and the surface of the treated layer. This clearance space forms a conduit through which cooler gaseous elements might obtain access to the high temperature zone, but by means of the downwardly inclined portion of the conveyer and the covering bridge $k$ this conduit is given a downward inclination and, being itself filled with highly heated and consequently lighter gaseous elements, it acts as a seal or lock to oppose the entrance of the colder and heavier surrounding atmosphere, thus preventing undesirable cooling of the reaction chamber and loss of heat.

As the layer of treated substance recedes from the heating device it is met by the slice $f^2$ which is set at such a distance from the surface of the band conveyer $e$ that it will remove substantially all of the substance which has been treated and leave the untreated portion to pass underneath with the conveyer and fall upon the screen $g$. The treated substance passes along the upper surface of the slice $f^2$ and, being broken up and fed forward by the toothed roll $g$, is carried over the end of the slice into the sump $h$ from which the treated substance is removed by the screw conveyer $i'$.

The untreated substance passing beneath the slice $f^2$ falls through the screen $g$ and is returned to the sump $l$ by the screw conveyer *i*. At the same time, portions of substance which have been sufficiently heated to complete the reaction treatment but which have been just beyond the range of the dividing element or slice $f^2$ are, if of sufficient magnitude, retained upon the screen and gravitate down it into the sump *h*.

To prevent injurious reactions taking place between the ingredients of the furnace walls and the material treated, heat transmission along the sides of the reaction chamber may be reduced so that the material which passes through in immediate proximity to the walls shall not be exposed to sufficient heat to react injuriously with the ingredients of the walls. This may also be accomplished by giving the surface of the slowly moving charge such conformation relatively to the furnace walls that actual contact occurs only at points where the radiation of heat is so much reduced that no reaction can occur.

To effect the foregoing in one way the heat transmitting slab or membrane *b* has thickened edges $b^3$ where it adjoins the walls of the furnace so that much less heat is transmitted by these thicker parts than by the thinner part of the slab or membrane. Further, the front wall of the furnace may be designed, for instance, to give a flat surface to the top of the charge which enters the reaction chamber, while the inner edge of the walls of the said chamber may be formed as shown at $b^2$ in the drawing, so that only the outer and comparatively cool portions of the wall come in contact with the charge which at that point receives so small transmission of heat that no reaction need occur.

The reaction chamber *b* between the heating membrane *b'* and surface of the layer of substance upon the conveyer *e* may have gases supplied to it when they are desired to take part in the reaction as, for instance, by the pipe *m*, or inert gas may be supplied to the chamber if so desired.

It will be seen that in the above method of working the material treated is used everywhere as an insulator between the localized hot zone and all such parts of the oven or retort or its feeding appliances which could be affected by the high temperatures or the action of the materials at these temperatures, and this may be carried out to any greater or lesser extent according to the substance operated upon and the temperatures required. Again, in this method it is possible to use ordinary metal band conveyers or other similar apparatus and thus secure continuous working of the process without adversely affecting the moving parts of the apparatus.

It will be seen that the time period during which the material to be treated is exposed to the high temperature can be regulated as desired, while the losses which occur in the usual intermittent working of high temperature reactions are avoided in this process.

Many modifications and additions may be introduced without in any way departing from the spirit of the invention.

Having now fully described and ascertained my said invention and the manner in which it is to be performed, I declare that what I claim is:—

1. Apparatus for conducting high temperature reactions comprising an area in which an intense heat is maintained, heat insulating walls depending to a similar level surrounding at least the greater part of the perimeter of said area, a conveying surface of a width exceeding the transverse exterior dimensions across said walls, moving below and parallel with the level to which they depend, and means for depositing subdivided substance to be treated upon said surface in a continuous layer of sufficient thickness to contact with the bottom and lower outer surface of the said walls.

2. Apparatus for conducting high temperature reactions comprising an area in which an intense heat is maintained, heat insulating walls dependent to a similar level surrounding at least the greater part of the perimeter of said area, a conveying surface of a width exceeding the transverse exterior dimensions across said walls, moving below and parallel with the level to which they depend, at a distance therefrom greater than the temperature can materially penetrate a sub-divided substance supported thereon, and means for depositing said substance upon said surface in a continuous layer of greater thickness than the distance between said surface and the bottom level of said walls.

3. Apparatus for conducting high temperature reactions, comprising an area of intense heat and a moving band conveyer parallel with said area and carrying a layer of the subdivided substance to be treated, said layer being wider than the outside width of the heating device and thicker than the distance from the perimeter thereof to the conveyer, so that said heating device sweeps a recessed path for itself in the moving layer.

4. In combination in apparatus for conducting high temperature reactions, a highly heated chamber having an open bottom, walls bounding the front and two longitudinal sides of said chamber depending to the same common level, a conveyer surface moving beneath and parallel with the bottom level of said walls at a determined distance therefrom, and means for depositing a continuous layer of subdivided substance upon said surface of a thickness exceeding the space between said surface and said walls.

5. In combination in apparatus for conducting high temperature reactions, a highly heated chamber having an open bottom, walls bounding the front and two longitudinal sides of said chamber depending to the same common level, a wall bounding the fourth rearward side of said chamber which does not reach as low as the level of said other walls, a downwardly sloping bridge extending rearward from the bottom of said fourth wall, a conveyer surface moving first beneath and parallel with the bottom level of said first three walls at a determined distance therefrom and being then deflected to move beneath and parallel with said fourth wall and the sloping bridge, and means for depositing a continuous layer of subdivided substance upon said surface of a thickness exceeding the space between said surface and said first three walls.

6. In combination in apparatus for conducting high temperature reactions, a highly heated chamber having an open bottom, walls bounding the front and two longitudinal sides of said chamber depending to the same common level, a conveyer surface moving beneath and parallel with the bottom level of said walls at a determined distance therefrom, means for depositing a continuous layer of subdivided substance upon said surface of a thickness exceeding the space between said surface and said walls, and means comprising a roller having teeth or the like projecting therefrom, coöperating with a slice or like dividing means for breaking up and discharging from the apparatus, the treated substance.

7. In combination in apparatus for conducting high temperature reactions, a highly heated chamber having an open bottom, walls bounding the front and two longitudinal sides of said chamber depending to the same common level, and having beveled bottom edges which are lower upon the outer than upon the inner sides, a conveyer surface moving beneath and parallel with the bottom level of said walls at a determined distance therefrom, and means for depositing a continuous layer of subdivided substance upon said surface of a thickness exceeding the space between said surface and said walls.

8. In combination in apparatus for conducting high temperature reactions, a highly heated chamber having an open bottom, walls bounding the front and two longitudinal sides of said chamber depending to the same common level, and having beveled bottom edges which are lower upon the outer than upon the inner sides, a wall bounding the fourth rearward side of said chamber which does not reach as low as the level of said other walls, a downwardly sloping bridge extending rearward from the bottom of said fourth wall, a conveyer surface moving first beneath and parallel with the bottom level of said first three walls at a determined distance therefrom and being then deflected to move beneath and parallel with said fourth wall and the sloping bridge, and means for depositing a continuous layer of subdivided substance upon said surface of a thickness exceeding the space between said surfaces and said first three walls.

9. In combination in apparatus for conducting high temperature reactions, a highly heated chamber having an open bottom, walls bounding the front and two longitudinal sides of said chamber depending to the same common level, and having beveled bottom edges which are lower upon the outer than upon the inner sides, a wall bounding the fourth rearward side of said chamber which does not reach as low as the level of said other walls, a downwardly sloping bridge extending rearward from the bottom of said fourth wall, a conveyer surface moving first beneath and parallel with the bottom level of said first three walls at a determined distance therefrom and being then deflected to move beneath and parallel with said fourth wall and the sloping bridge, means for depositing a continuous layer of subdivided substance upon said surface of a thickness exceeding the space between said surface and said walls, and means comprising a roller having teeth or the like projecting therefrom, coöperating with a slice or like dividing means for breaking up and discharging from the apparatus, the treated substance.

10. In combination in apparatus for conducting high temperature reactions, a chamber containing a highly heated membrane and having an open bottom, walls bounding the front and two longitudinal sides of said chamber depending to the same common level, a conveyer surface moving beneath and parallel with the bottom level of said walls at a determined distance therefrom, and means for depositing a continuous layer of subdivided substance upon said surface of a thickness exceeding the space between said surface and said walls.

11. In combination in apparatus for conducting high temperature reactions, a chamber containing a highly heated membrane and having an open bottom, walls bounding the front and two longitudinal sides of said chamber depending to the same common level, and having beveled bottom edges which are lower upon the outer than upon the inner sides, a wall bounding the fourth rearward side of said chamber which does not reach as low as the level of said other walls, a downwardly sloping bridge extending rearward from the bottom of said fourth wall, a conveyer surface moving first beneath and parallel with the bottom level of said first three walls at a determined distance therefrom and being then deflected to move beneath and parallel with said fourth wall and the sloping bridge, and means for depositing a continuous layer of subdivided substance upon said surface of a thickness exceeding the space between said surfaces and said first three walls.

In testimony whereof I have signed my name to this specification.

NILS TESTRUP.